US006408784B1

(12) United States Patent
Ross

(10) Patent No.: US 6,408,784 B1
(45) Date of Patent: Jun. 25, 2002

(54) INSTRUMENT POINTER WITH INTEGRAL WARNING INDICATOR

(75) Inventor: David Alan Ross, Columbiaville, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/579,482

(22) Filed: May 30, 2000

(51) Int. Cl.[7] .............................................. G01D 11/28
(52) U.S. Cl. ........................ 116/288; 116/300; 362/26
(58) Field of Search .............................. 116/284, 286, 116/287, 288, 293, 300, 302, 304, 305; 362/23, 26, 31, 32, 27, 29, 30, 28

(56) References Cited

U.S. PATENT DOCUMENTS

| 3,691,986 A | * | 9/1972 | Gancher ..................... 116/302 |
| 4,218,726 A | * | 8/1980 | Fukasawa et al. ............. 362/31 |
| 5,036,440 A | * | 7/1991 | Takii et al. ................... 362/29 |
| 5,142,456 A | * | 8/1992 | Murphy ........................ 362/26 |
| 5,458,082 A | * | 10/1995 | Cookingham ............... 116/288 |
| 6,182,601 B1 | * | 2/2001 | Baatz .......................... 116/288 |

* cited by examiner

Primary Examiner—Andrew H. Hirshfeld
(74) Attorney, Agent, or Firm—Jimmy L. Funke

(57) ABSTRACT

An illuminated pointer member with an integral warning indicator. The pointer member is illuminated with an off-center illumination source. The transparent central shaft member has a second light source at one end and a transparent panel member at the opposite end in the instrument pointer cap member. The pointer member is illuminated in a conventional manner to provide illuminated indicia on the instrument panel. The second light source is illuminated under certain conditions to provide a warning indicator through the panel member in the cap to the operator in the event of the occurrence of certain conditions.

7 Claims, 1 Drawing Sheet

INSTRUMENT POINTER WITH INTEGRAL WARNING INDICATOR

TECHNICAL FIELD

The invention relates to illuminated pointers for instrument panels.

BACKGROUND OF THE INVENTION

Automotive instrument panels and clusters typically employ a face plate having a body of transparent light conducting material and a decorative outer applique which includes legends and indicia for the instrument and gauges. Gauges which are mounted behind the face plate have one or more translucent pointers which are arranged to move along or around the indicia to highlight various data to the vehicle operator, such as vehicle speed, engine temperature, fuel level and the like.

To increase visibility at night, the instrument pointers are typically illuminated by lamps or other light sources. Typically, the lamps are arranged around the periphery of the face plate which conducts some light to each of the pointers through its transparent material. Since the light sources are positioned at a distance from the pointers, much of the light intensity and illumination is lost in the transmission.

Often, warning indicators are included on the instrument cluster or panel in order to advise the vehicle operator of certain conditions. These conditions include low fuel, low battery level, low oil level, increased temperature, and the like. The warning indicators are typically positioned at a distance from the instrument or gauge which normally displays the indicia relative to that system to the operator.

It would be desirable to provide increased illumination to instrument pointers, particularly where gauge motors and/or gear mechanisms are positioned directly behind them. It also would be desirable to provide a warning indicator at or immediately adjacent to the instrument pointer and gauge that relates to the system in question.

SUMMARY OF THE INVENTION

It is therefore an object of the present invention to provide an improved illuminated pointer member for an instrument cluster or panel. It is also an object of the present invention to provide an illuminated pointer member which offers increased illumination over known pointer members. It is a further object of the present invention to provide an instrument gauge and pointer member with a warning indicator immediately adjacent thereto or part thereof.

The present invention accomplishes and meets these objectives by providing an illuminated pointer member with an integral warning indicator mechanism. The pointer member is attached to a transparent or hollow shaft member. The pointer member is illuminated by an off-center light pick up mechanism adjacent the shaft member. A light source is positioned to illuminate the shaft member at a prespecified time or in the event of a certain condition being reached. A transparent indicator panel or member on the pointer cover or button member allows light from the shaft member to be immediately visible to the vehicle operator.

The above and other objects, features and advantages of the present invention will become apparent from the following detailed description of the invention when taken in conjunction with the accompanying drawings and appended claims.

DESCRIPTION OF THE PREFERRED EMBODIMENTS

Figure 1:
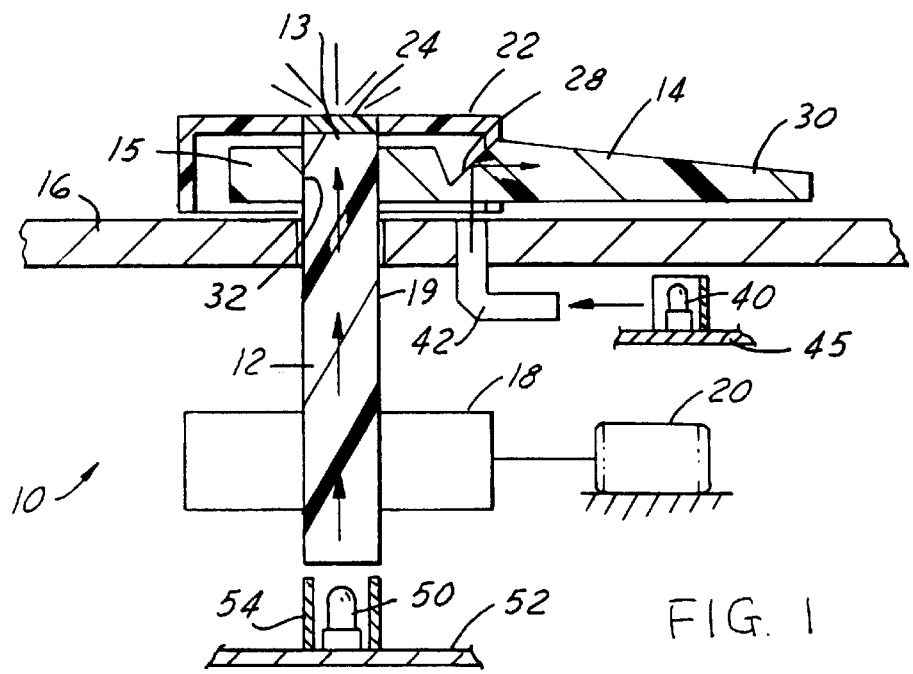
FIG. 1 is a schematic drawing of an embodiment of the present invention.
Figure 2:
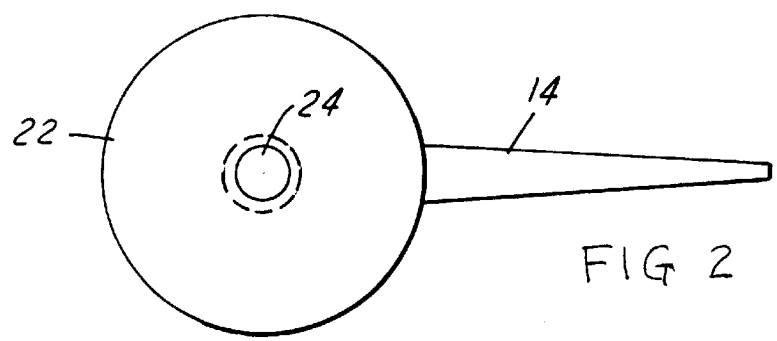
FIG. 2 is a top elevational view of the embodiment shown in FIG. 1.

Referring to FIGS. 1 and 2, an instrument pointer mechanism is generally referred to by the reference numeral 10. The mechanism generally includes a central shaft member 12 and an instrument pointer member 14 attached at one end 13 of the shaft member 12. The shaft member 12 and pointer member 14 are both made from a transparent plastic material which allows transmission of light therethrough. The mechanism 10 is supported in a face plate or instrument panel 16 in a conventional manner and adapted to be rotated by a gear member 18 which in turn is operated by a motor 20.

A cap or button member 22 is positioned over the instrument pointer and central shaft member 12 to provide an aesthetic appearance to the vehicle operator. The cap member 22 is preferably a non-transparent material, or has a non-transparent coating or covering on it, and has a transparent panel member 24 in the center thereof. In the alternative, the end 13 of the central shaft member 12 could be exposed to the vehicle operation through the cap member 22, or have a colored end cap thereon. Panel member 24 is in axial alignment with the longitudinal shaft member 12 such that light passing along the shaft member 12 will be displayed through it. Appropriate graphics, applique and indicia can be imprinted on the cap member 22 as desired, depending on the particular use and object of the instrument pointer mechanism 10.

As indicated, the pointer member 14 is made of a transparent material suitable for conducting light by internal reflections. It has a lower light receiving surface 26 facing in the direction of the panel member 16, an upper approximately 45° angle light reflecting surface 28 opposite the receiving surface 26, a central body portion 15, and an elongated finger member 30 which is tapered in a conventional manner to display illumination uniformly along the length thereof.

The cap member 22 covers the upper angled surface 28 and contains any light which may leak through the pointer in that area. The cap member 22 can be molded separately, molded integrally with the pointer member 14 and body member 15 and/or attached in a conventional manner. The pointer member 14 also has a socket 32 for mounting on the central cylindrical shaft member 12.

The pointer member 14 is illuminated in a conventional manner by light emanating from a lamp or light source 40 which is transmitted to the light receiving surface 26 by a light pipe 42 or the like. In this regard, the light source 40 can be utilized to illuminate several instrument pointer members and other illuminated instruments on the instrument panel 16, as desired.

The light or illumination from the light source 40 and light pipe 42 result in uniform brightness and illumination of the pointer member 14 throughout its range of movement. Placement of the light pipe 42 and the light receiving surface 26 result in efficient light coupling into the light receiving surface so that a high level of brightness can be achieved. The light source 40 and associated electrical leads are mounted in a conventional manner, such as being positioned on a printed circuitboard or other support member 45.

A second lamp or light source 50 is utilized to provide illumination through the transparent shaft member 12. The light source 50 can be an LED, light bulb, or the like and is mounted on a circuit board or other support member 52. In order to prevent light from leaking or escaping from light bulb 50, a container or shield 54 is provided around it. The shield 54 also helps direct the light into and through the shaft member 12. Preferably, the shaft member 12 is coated with a reflective material on its outer surface 19 in order to retain the light in the shaft and prevent it from escaping.

Light transmitted through the shaft 12 illuminates the warning indicator panel 24 on the cap member 22. Thus, when the vehicle system, such as the electronic control unit (ECU) or the like, receives a signal indicating a problem or concern of some type with a particular operating system of the vehicle, the light source 50 can be activated, thus illuminating the panel 24 and providing an appropriate warning indication to the vehicle operator. Since the warning indicator is a part of, and directly associated with, a particular instrument pointer member, the operator will immediately know that the warning indicator relates to the particular system associated with the instrument pointer. Also, appropriated graphics or appliques can be provided on the cap member 22 and/or the panel 24 to further inform and advise the operator relative to the particular system involved and the problem or concern for which the warning indicator was illuminated. The graphics can be positioned on the cap such that it is in the correct viewable position for the operator when the pointer is in the position that would require a warning indication to be shown.

As an alternative to a warning indicator, a particular logo or symbol could be illuminated as desired on the cap member or pointer member. The indicator could be illuminated randomly on any particular periodic interval as desired by the vehicle manufacturer and/or vehicle operator.

Also, the panel member 24 could be provided of a different color material than the cap member 22. For example, the panel member 24 could be of a red colored material in order to emphasize the warning nature of the indication when illuminated.

As an alternative, other sizes and shapes of warning indicators could be positioned on the cap member 22. For example, in FIGS. 1 and 2, a circular panel member 22 is provided. However, other shapes and sizes of warning indicators could be utilized, such as concentric rings, various letters or numbers, or various shapes or symbols. Moreover, a certain indicia or symbol could be applied to the panel member 24 in order to better advise the operator. For example, the symbols could be a gasoline pump to indicate low fuel level, an oil can to indicate low oil level, a thermometer to indicate a temperature problem, or the like.

With the present invention, warning indicators can be provided in limited space situations, which are important on small compact vehicles and other small vehicles, such as motorcycles.

Figure 3:
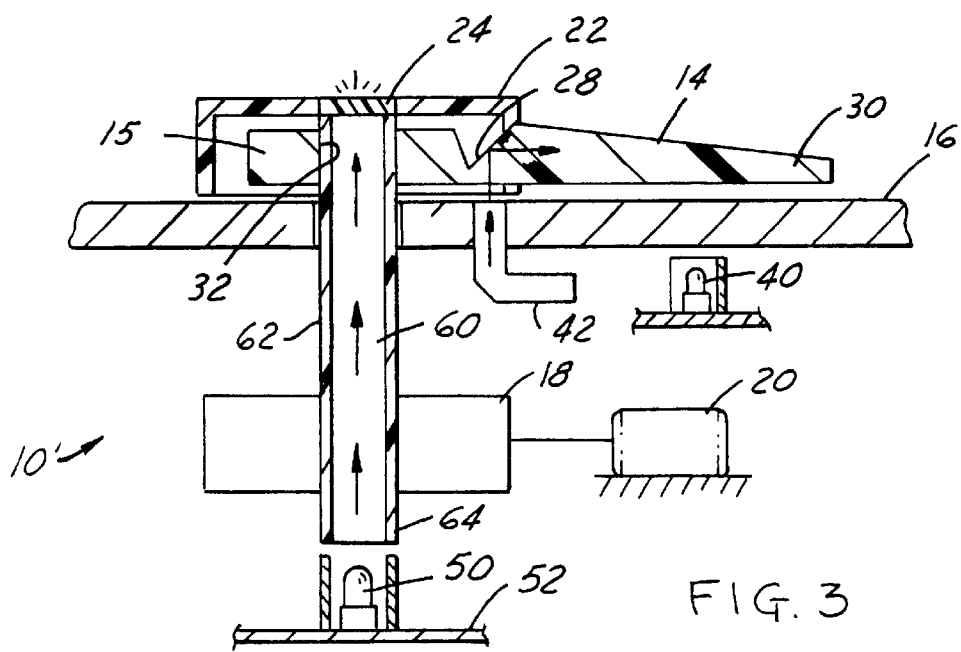
FIG. 3 illustrates another embodiment of the present invention.

An alternate embodiment 10' of the invention is shown in FIG. 3. In this embodiment, the central shaft member has been replaced with a hollow tubular member 60. The hollow tubular member transmits light more easily and directly to the warning indicator panel 24 and provides a brighter illumination of it. Again, preferably, the inner surface of the tubular member has a reflective coating or material applied to it in order to reflect light as it is transmitted through the shaft member.

With the embodiment 10' shown in FIG. 3, it is also possible to mount the second light source 50 inside the open lower end 64 of the tubular member. This would provide a more compact product and reduce the overall size of the instrumentation illumination mechanism.

While particular embodiments of the invention have been shown and described, numerous variations and alternate embodiments will occur to those skilled in the art. Accordingly, it is intended that the invention be limited only in terms of the appended claims.

What is claimed is:

1. An illuminated indicator member for a gauge in a vehicle comprising:

a light transmitting shaft member having a first end and a second end;

means for rotating said shaft member;

a pointer member positioned on said first end of said shaft member, said pointer member having a body portion and a finger portion;

a first light source for providing illumination to said finger portion;

a second light source for providing illumination to said second end of said shaft member, through said shaft member and to an indicator panel visible through a cap member on said body portion, light from said second light source being prevented from traveling from said shaft member into said pointer member, wherein illumination of said indicator panel is independent from illumination of said pointer member;

wherein when said second light source is illuminated, a warning indicator is made visible to the vehicle operator.

2. The illuminated indicator member as recited in claim 1 wherein said means for rotating said shaft member comprises a motor and gear mechanism.

3. The illuminated indicator member as recited in claim 1 wherein said indicator panel is positioned in said cap member.

4. The illuminated indicator member as recited in claim 1 wherein said shaft member is made from a solid transparent material.

5. The illuminated indicator member as recited in claim 1 wherein said shaft member is a hollow tubular member.

6. The illuminated indicator member as recited in claim 1 wherein said shaft member is covered with a reflective material.

7. The illuminated indicator member as recited in claim 1 further comprising a light pick up surface and a reflective surface on said pointer member for receiving and reflecting light from said first light source to said finger portion.

* * * * *